(12) United States Patent
Makela et al.

(10) Patent No.: US 6,961,860 B2
(45) Date of Patent: Nov. 1, 2005

(54) METHOD AND SYSTEM FOR OPTIMIZING POWER CONSUMPTION DURING DATA READ/WRITE OPERATION IN DISK-BASED MEMORY

(75) Inventors: Jakke Makela, Turku (FI); Venkatesh Vadde, Fremont, CA (US)

(73) Assignee: Nokia Corporation, Expoo (FI)

(*) Notice: Subject to any disclaimer, the term of this patent is extended or adjusted under 35 U.S.C. 154(b) by 676 days.

(21) Appl. No.: 10/012,801

(22) Filed: Dec. 7, 2001

(65) Prior Publication Data

US 2003/0117916 A1 Jun. 26, 2003

(51) Int. Cl.[7] .............................................. G11B 5/09
(52) U.S. Cl. .................. 713/322; 369/47.15; 369/47.4; 369/47.51; 369/53.26; 369/13.26; 369/116
(58) Field of Search ..................... 713/322; 369/47.4, 369/47.15, 47.51, 47.5, 53.1, 116; 360/78.01

(56) References Cited

U.S. PATENT DOCUMENTS

| | | | | |
|---|---|---|---|---|
| 5,412,809 A | * | 5/1995 | Tam et al. ................. 713/324 |
| 5,452,277 A | * | 9/1995 | Bajorek et al. ........... 369/53.18 |
| 5,537,588 A | | 7/1996 | Engelmann et al. ........ 395/600 |
| 5,682,273 A | * | 10/1997 | Hetzler ........................ 360/75 |
| 5,787,292 A | * | 7/1998 | Ottesen et al. .............. 713/300 |
| 5,787,296 A | * | 7/1998 | Grimsrud et al. ........... 713/320 |
| 5,802,599 A | | 9/1998 | Cabrera et al. ............. 711/170 |
| 5,854,720 A | * | 12/1998 | Shrinkle et al. ............... 360/69 |
| 5,987,479 A | | 11/1999 | Oliver et al. ............... 707/205 |
| 6,052,347 A | * | 4/2000 | Miyata .................... 369/47.53 |
| 6,282,046 B1 | * | 8/2001 | Houston et al. ......... 360/73.03 |
| 6,310,747 B1 | * | 10/2001 | Emo et al. ............... 360/97.02 |
| 6,400,892 B1 | * | 6/2002 | Smith .......................... 386/125 |
| 6,512,652 B1 | * | 1/2003 | Nelson et al. ........... 360/78.01 |
| 6,622,252 B1 | * | 9/2003 | Klaassen et al. ............. 713/320 |
| 6,728,177 B2 | * | 4/2004 | Seong et al. ................ 369/47.4 |
| 6,836,454 B2 | * | 12/2004 | Sasaki et al. ............. 369/47.39 |

* cited by examiner

Primary Examiner—A. Elamin
(74) Attorney, Agent, or Firm—Harrington & Smith, LLP

(57) ABSTRACT

A method and system for optimizing energy consumption during data read/write operations in a disk-based memory system is provided. The method includes the steps of reading a data clip length, $L_s$ and determining an available energy-optimum recordable track segment.

37 Claims, 11 Drawing Sheets

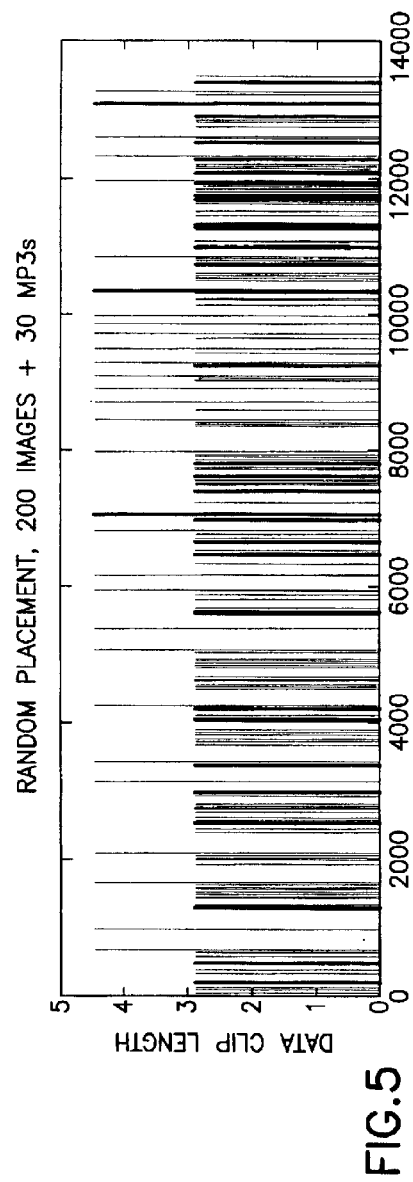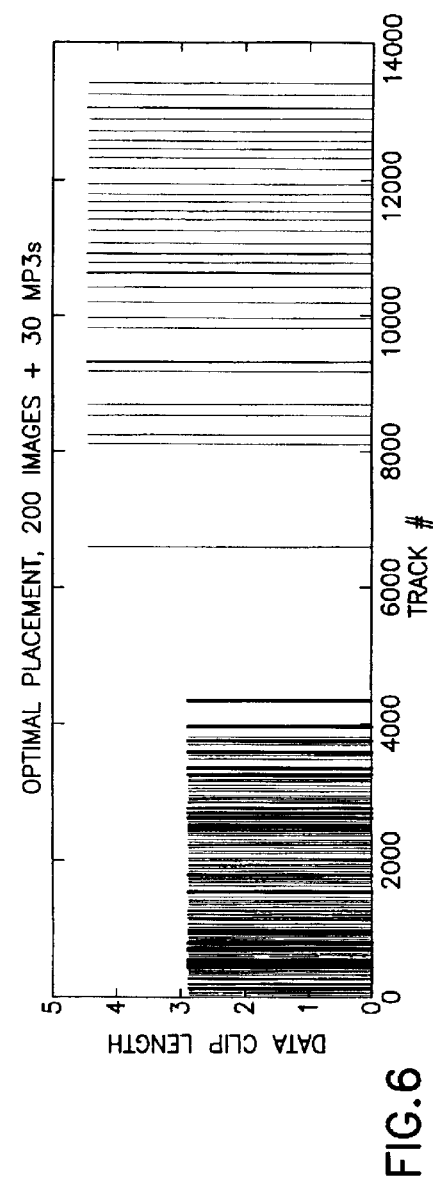
FIG. 5
FIG. 6

| s | THROUGHPUT (bits/s) |
|---|---|
| $\delta$ | LINEAR BIT DENSITY OF THE DISK (bit/mm) |
| $\omega$ | ROTATING SPEED OF THE DISK (rpm) |
| r | RADIUS(mm) |
| $\tau$ | TIME USED TO READ A CLIP(sec); TYPICALLY $\tau \ll T$(SEE BELOW) |
| P | POWER CONSUMPTION (mW) |
| k | DEPENDENCE OF POWER ON $\omega$: $P=\omega^k$. DEFAULT VALUE 3 |
| $\psi$ OR E | ENERGY EXPENDED (mJ) |
| L | LENGTH OF CLIP (bits) |
| T | MAXIMUM ALLOWED TIME TO READ CLIP (sec) |

FIG.11

| RADIUS | WORST ww | RANDOM | | | | | | | OPTIMIZED (ZONED 6:4) OW OR | | | | | OB | BEST TB |
|---|---|---|---|---|---|---|---|---|---|---|---|---|---|---|---|
| 12 | 6 | 6 | | 4 | 4 | | | | 4 | 4 | 4 | | | | |
| 14 | 6 | | 6 | | | 4 | | 4 | 4 | 4 | 4 | 4 | | | |
| 16 | 4 | 6 | 4 | | 6 | | 6 | | 4 | 4 | | | 4 | | |
| 18 | 4 | 4 | 4 | 4 | | 6 | 4 | | 4 | | | 4 | 4 | 4 | 4 | |
| 20 | 4 | | 4 | 6 | 6 | | 4 | 6 | 4 | 4 | | | 4 | 4 | 4 | |
| 22 | | | | 4 | 6 | 6 | 4 | 4 | 6 | | | | | | 4 | 4 |
| 24 | | 4 | | 6 | 4 | | | 6 | 6 | 6 | 6 | 6 | 6 | | | 4 |
| 26 | | | | | | 4 | 6 | | | 6 | 6 | | | 6 | | 4 |
| 28 | | 4 | | | | | | | 4 | | | | 6 | 6 | 6 | 6 |
| 30 | | | | | 4 | 4 | | | | | 6 | | | | 6 | 6 |
| | 78 | 64 | 48 | 42 | 42 | 31 | 31 | 27 | 23 | 55 | 50 | 51 | 34 | 24 | 17 | 10 |

FIG.12

| | WORST | RANDOM | | | | | | | | OPTIMIZED (ZONED 6:4) | | | | | | BEST |
|---|---|---|---|---|---|---|---|---|---|---|---|---|---|---|---|---|
| RADIUS | ww | | | | | | | | | OW | OR | | | | OB | TB |
| 12 | 6 | 6 | | 4 | | 4 | | | | 4 | 4 | | | 4 | | |
| 14 | 6 | | 6 | | | | 4 | | 4 | 4 | 4 | 4 | | 4 | | |
| 16 | 4 | 6 | 4 | | 6 | 6 | | 4 | | 4 | | | 4 | | | |
| 18 | 4 | 4 | 4 | 4 | 4 | | | 4 | 6 | | | 4 | 4 | 4 | 4 | |
| 20 | 4 | 4 | 6 | 6 | 6 | | 4 | | 4 | | 4 | 4 | 4 | | 4 | |
| 22 | | | | 4 | 4 | 6 | 4 | 6 | 6 | | | | | 4 | | 4 |
| 24 | | 4 | | 6 | | 4 | 6 | 6 | | 6 | 6 | 6 | | 6 | | 4 |
| 26 | | | | 4 | | | 6 | | | 6 | 6 | | 6 | | | 4 |
| 28 | | 4 | | | | | 4 | | | | | 6 | 6 | | 6 | 6 |
| 30 | | | | | 4 | | | | 4 | | | | | | 6 6 | 6 |
| | 160 | 146 | 134 | 129 | 123 | 115 | 115 | 114 | 109 | 135 | 130 | 117 | 112 | 109 | 82 | 72 |

FIG.13

| | WORST | RANDOM | | | | | | | | OPTIMIZED (ZONED 6:4) | | | | | | BEST |
|---|---|---|---|---|---|---|---|---|---|---|---|---|---|---|---|---|
| RADIUS | ww | | | | | | | | | OW | | | | OR | OB | TB |
| 12 | 6 6 | 4 2 | | | 6 6 | | | | 4 2 | 6 6 | | | | 6 6 | | |
| 14 | 6 6 | | 6 6 | 4 2 | | | | | 4 2 | 6 6 | 6 6 | 6 6 | 6 6 | | | |
| 16 | 4 2 | | 4 2 | 4 2 | | 6 6 | 4 2 | 6 6 | 6 6 | | 6 6 | | | | 6 6 | |
| 18 | 4 2 | 4 2 | 4 2 | | 4 2 | 4 2 | 4 2 | | 6 6 | | | 6 6 | 6 6 | 6 6 | 6 6 | |
| 20 | 4 2 | 6 6 | 6 6 | 4 2 | 4 2 | | 6 6 | | 4 2 | 4 2 | | | | | | |
| 22 | | 4 2 | | 4 2 | | 6 6 | 4 2 | 6 6 | 6 6 | 4 2 | 4 2 | 4 2 | 4 2 | | | 6 |
| 24 | | 6 6 | | 6 6 | 4 2 | 6 6 | | 4 2 | | 4 2 | 4 2 | 4 2 | | 4 2 | | 6 |
| 26 | | | | 6 6 | | | 4 2 | | | | 4 2 | | 4 2 | 4 2 | 4 2 | 4 |
| 28 | | 4 2 | | | | 4 2 | | | | | | 4 2 | | | 4 2 | 4 |
| 30 | | | | | | | | | 4 2 | 4 2 | | | 4 2 | 4 2 | 4 2 | 4 |
| | 36 | 35 | 32 | 32 | 32 | 30 | 29 | 26 | 25 | 31 | 28 | 27 | 21 | 21 | 19 | 17 |

FIG.14

METHOD AND SYSTEM FOR OPTIMIZING POWER CONSUMPTION DURING DATA READ/WRITE OPERATION IN DISK-BASED MEMORY

BACKGROUND OF THE INVENTION

1. Field of the Invention

The present invention relates to mass data storage and, more particularly, to optimizing mass data storage in a mobile terminal disk-based memory in order to minimize power consumption during data retrieval.

2. Prior Art

With regard to mass storage devices in mobile terminals, solid-state flash cards are the most commonly used technology. However, the cost per storage area is relatively high when compared with high capacity disk based memory systems. On the other hand, a disadvantage with disk-based storage systems is the high power drain due to factors such as the combined power needed to rotate the memory disk and, at the same time, actuate the disk heads. It will be appreciated that this disadvantage is exacerbated in power-limited devices such as battery-powered mobile phones and other battery powered devices.

Therefore, it is desirable to provide a method and system to optimize data object placement in a disk-based memory system so that power consumption is optimized, thereby extending battery life.

SUMMARY OF THE INVENTION

The foregoing and other problems are overcome, and other advantages are realized, in accordance with the presently preferred embodiments of these teachings.

In accordance with one embodiment of the present invention a method for optimizing energy consumption during data read/write operations in a disk-based memory system is provided. The method includes the steps of reading a data clip length, $L_s$ and determining an available energy-optimum recordable track segment and writing the data clip length $L_s$ on the optimum recordable track segment.

In accordance with another embodiment of the invention an energy efficient disk management system is provided. The system includes a controller, a wireless transceiver, and a disk-based memory having memory disk radii $R_0 \ldots R_m$. The disk-based memory system is adapted to minimize power consumption E during data clip read/write operations by selecting a power efficient disk radius associated with a track segment to read/write a particular data clip.

In accordance with another embodiment of the invention a method for optimizing energy consumption during data read/write operations in a mobile device is provided. The method includes the step of providing a disk-based memory having a plurality of recordable track segments and associated track radii $R_0 \ldots R_m$. The next step reads a data clip length, $L_s$, and determines a corresponding energy-optimum recordable track segment from the plurality of recordable tracks; to which the data clip length $L_s$ is recorded.

BRIEF DESCRIPTION OF THE DRAWINGS

The foregoing aspects and other features of the present invention are explained in the following description, taken in connection with the accompanying drawings, wherein:

FIG. 5 is a graphical representation of the random distribution of 200 images+30 MP3 data clips;

FIG. 6 is a graphical representation of an optimized distribution of 200 images+30 MP3 data clips in accordance with the features of the present invention;

FIG. 11 is a table identifying variable names;

FIG. 12 is a clip distribution table showing relative clip distributions in a CLV embodiment;

FIG. 13 is a clip distribution table showing relative clip distributions in a CAV embodiment;

FIG. 14 is a clip distribution table showing relative clip distributions in a zoned-CLV embodiment.

DETAILED DESCRIPTION OF THE PREFERRED EMBODIMENT

Figure 1:
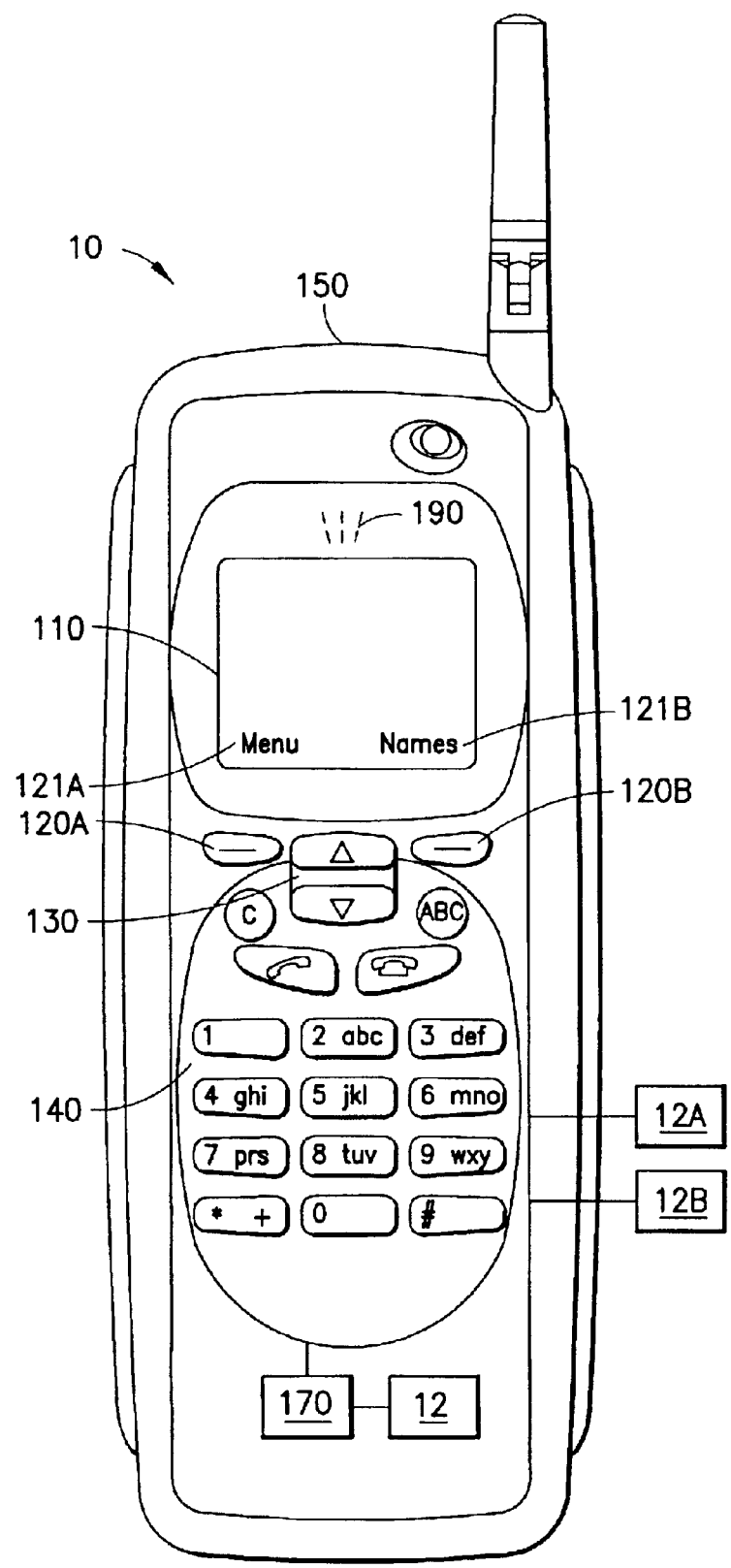
FIG. 1 is a perspective view of a mobile station incorporating features of the present invention.
Figure 10A:
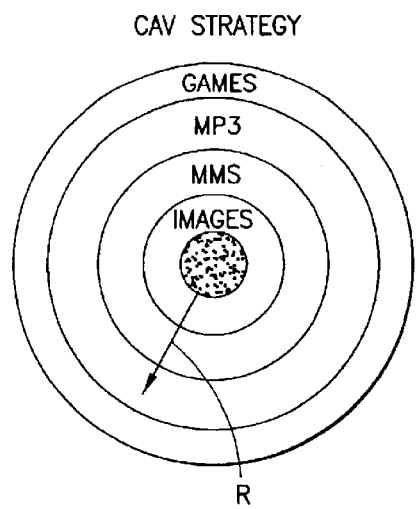
FIGS. 10A–10C are pictorial diagrams of CAV clip distribution, CLV clip distribution, and mixed CAV/CLV distribution.
Figure 10B:
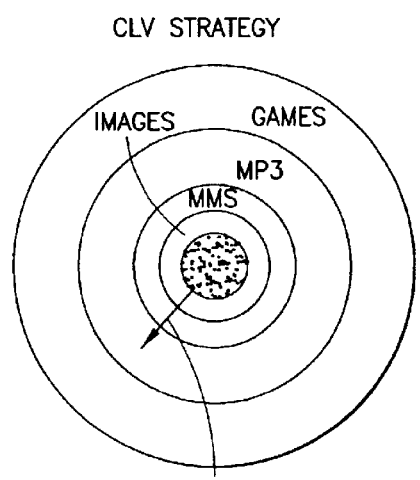
Figure 10C:
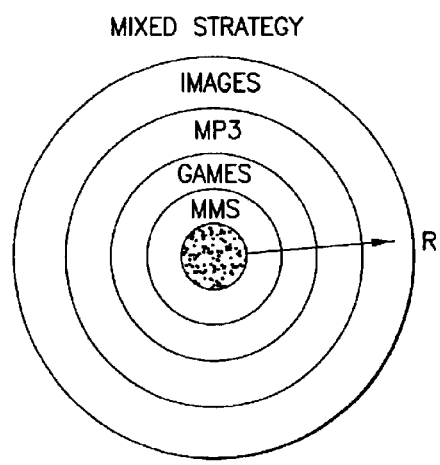

Although the present invention will be described with reference to several embodiments shown in the drawings, it should be understood that the present invention can be embodied in many alternate forms of embodiments Referring to FIG. 1 there is shown a pictorial representation of a Mobile station 10 incorporating features of this invention. Mobile station 10 includes a display 110 that displays data, menus and areas for softkey functions 121A and 121B that can be activated by pressing of softkeys 120A and 120B. Scroll keys 130 are also provided to scroll through menu items featured on display 110. Scroll keys 130 may also be a rolling cylinder, ball or the like which will allow for scrolling through items displayed. Keyboard 140 operates for the input of data. The keys of keyboard 140 may also be illuminated by various methods known to those skilled in the art to produce a visual reminder in response to an event. Entry of data may be facilitated by the use of predictive keyboard entry that is known by those skilled in the art. Data is stored in a memory 12. Memory 12 may include volatile Random Access Memory (RAM) including a cache area for the temporary storage of data. Mobile station 10 may also include non-volatile memory 12A, which may be embedded or removable. Non-volatile memory 12A may be EEPROM or flash memory and the like. The mobile station 10 also includes a disk-based memory device 12B wherein data objects, particularly multimedia data objects, such as, but not limited to those shown in FIGS. 10A–10C, are stored in accordance with the teachings of this invention in order to optimize power consumption.

Figure 2:
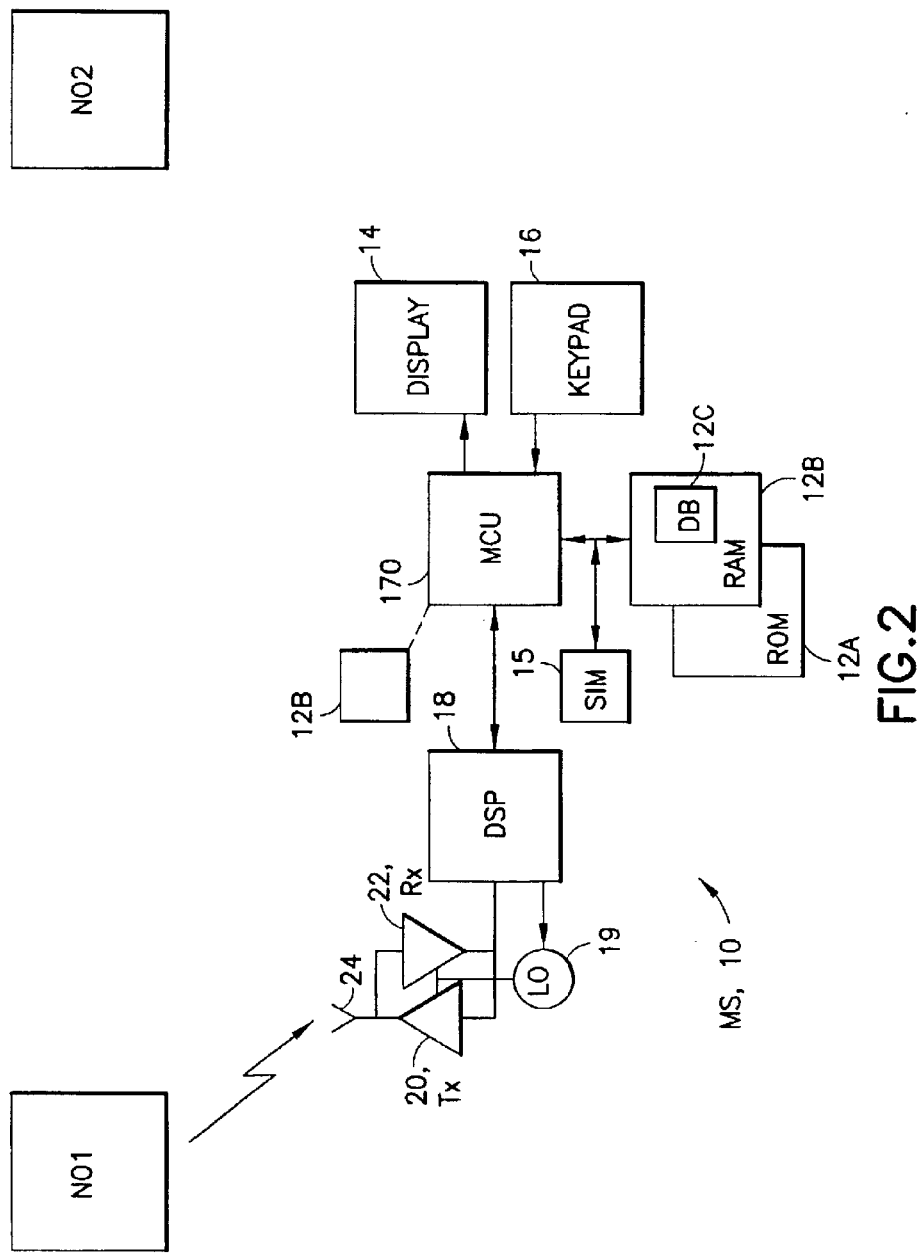
FIG. 2 is a block diagram of the mobile station shown in FIG. 1 that is constructed and operated in accordance with this invention.

Referring to FIG. 2, therein is illustrated a simplified block diagram of an embodiment of mobile station 10 that is suitable for practicing this invention. FIG. 2 also shows a first network operator (NO1), also referred to herein simply as a first system, that transmits in a forward or downlink direction both physical and logical channels to the mobile station 10 in accordance with a predetermined air interface standard or protocol.

The mobile station 10 includes a micro-control unit (MCU) 170 having an output coupled to an input of a display 14 and an input coupled to an output of a keyboard or keypad 16. The mobile station 10 may be considered to be a radiotelephone, such as a cellular telephone or a personal communicator having voice an/or packet data capabilities, or it may be a wireless packet data terminal. The mobile station 10 contains a wireless section that includes a digital signal processor (DSP) 18, or equivalent high-speed processor, as well as a wireless transceiver comprised of a transmitter 20 and a receiver 22, both of which are coupled to an antenna 24 for communication with the currently selected network operator. Some type of local oscillator (LO) 19, which enables the transceiver to tune to different frequency channels when scanning and otherwise acquiring service, is controlled from the DSP 18. The MCU 170 is assumed to include or be coupled to a read-only memory (ROM) 12A for storing an operating program, as well as a random access memory (RAM) 12B for temporarily storing required data, scratchpad memory, etc.

A portion of the RAM 12B may be non-volatile, enabling data to be retained when power is turned off. The non-volatile portion of the RAM 12B is assumed to store a multi-protocol system selection database (DB) 12C that is organized and managed in accordance with the teachings herein. A separate removable SIM 15 can be provided as well, the SIM storing, for example, subscriber-related information. As noted, the mobile station 10 also includes a disk based memory device 12B wherein data objects, particularly multimedia data objects are stored and retrieved in accordance with the teachings presented herein.

Figure 15A:
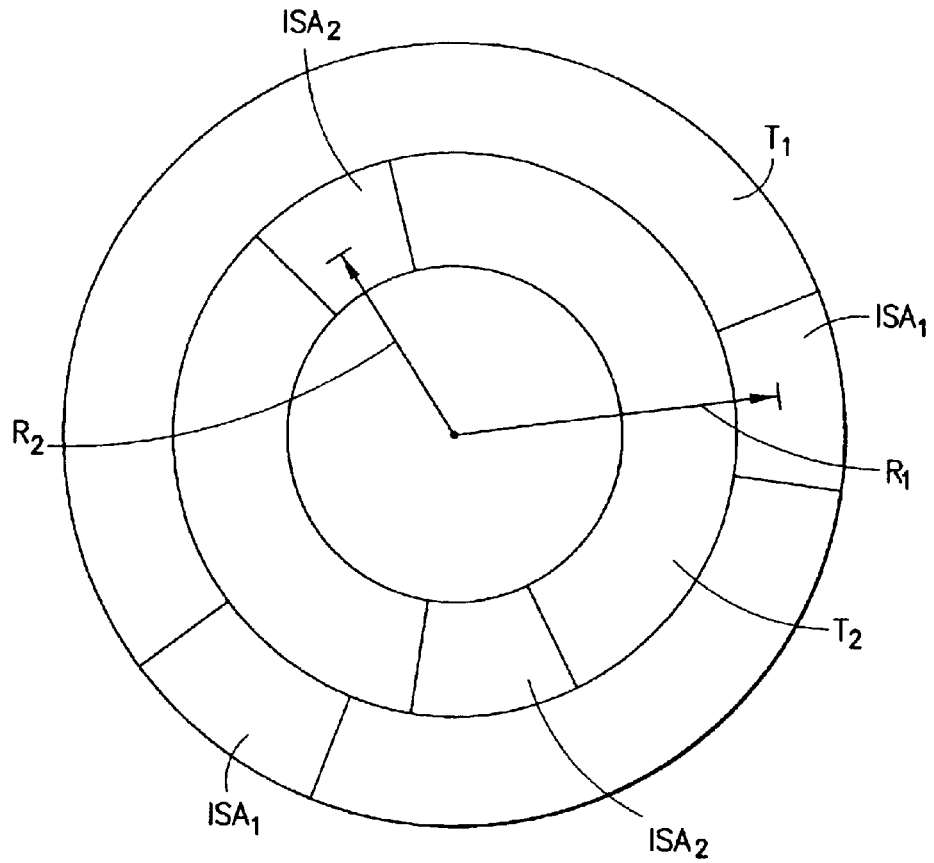
FIGS. 15A–15B are pictorial diagrams of multiple symmetrical recordable tracks and a spiral recordable track, respectively, and their associated recordable segments incorporating features of the present invention shown in FIG. 1.
Figure 15B:
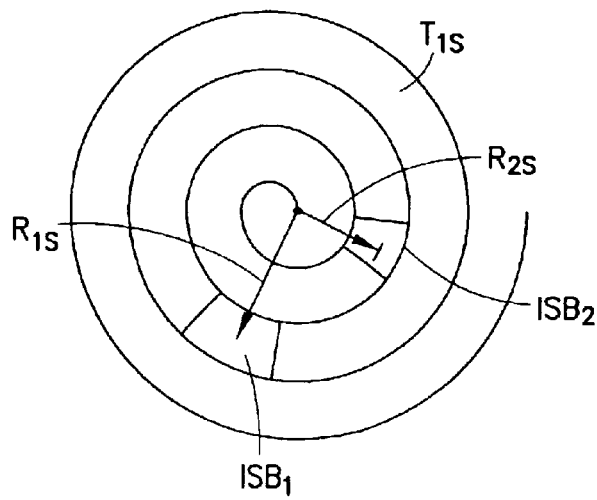

Referring also to FIGS. 10A–10C, R is defined to be the radius (the distance from the center of the disk) to where a clip is stored on a track of the disk-based memory device 12B. In order to optimize power consumption during clip retrieval, a corresponding optimal range for R is determined in accordance with the teachings of the invention. In alternate embodiments R may correspond to the radius of particular track segments within a track as shown in FIG. 15A, items 15A1 and 15A2. Referring also to FIG. 15B R may correspond to a particular track segment such as 15B2 in spiraling track $T_{1S}$. Spiraling track $T_{1S}$ may be any suitable spiraling track such as, for example, a symmetrical spiraling track or mathematically derived spiral track such as a logarithmic spiral track.

Advantageously, the invention recognizes that many multimedia data objects are fixed-length files (herein called clips). The invention also advantageously recognizes that the maximum length L (bits) and maximum allowable time T (sec) for reading the entire clip is known or may be determined or estimated. For example, in one embodiment, a digital image length L of one clip is usually smaller than 100 kB while the whole clip must be read in less than 1 s;

in alternate embodiments, using MP3 files, length L is generally greater than 4 MB while T can be up to the length of the clip playing time (e.g., up to some number of minutes).

Advantageously, the invention exploits the clustering tendency of the lengths Ls and times Ts for many data types expected to be used in mobile terminals. For example, MP3 clips typically have lengths L clustered around approximately 4 MB and read times T grouped around 2–3 minutes (s~10 kbits/s). Image files may have lengths below 100 kB but must be read in times below one second (s~100 kbits/s).

Referring also to FIG. 11, the parameters used in the following teachings are defined.

In general, the power consumption of a disk drive as function of the rotation speed ω is given by a function P(ω). Also, in the general case, a disk throughput relationship may be defined as $s(\omega,r)=\sigma(r)\omega(r)r$.

The power profile may then be represented by:

$$\psi(\omega, r) = P(\omega(r))L / s(\omega, r) = \frac{P(\omega(r))}{r\sigma(r)\omega(r)} L \equiv \xi(r)L \qquad \text{(Eq. 1A)}$$

That distribution which minimizes this general energy function is then the optimal distribution. In the general case, the values can be determined as long as: σ(r) is pre-defined, ω (or) is pre-defined, and P (ω(r)) is empirically determined for the system.

In one embodiment, the teachings are applicable to constant linear velocity (CLV) disk systems. In alternate embodiments the teachings are combined with an angular velocity (AV) disk system, such as, for example, a constant angular velocity (CAV) disk system. Many modern disk systems follow a CAV strategy or a more complicated zoning system based on CAV. The teachings of the invention will be described and made clear with reference to these alternate embodiments.

For these alternate embodiments the disk throughput equation may be approximated as:

$$s=\sigma\omega r. \qquad \text{(Eq1)}$$

and power consumption used up by a rotating disk is substantially proportional to $\omega^\kappa$. In a preferred CLV embodiment, but not limiting, κ=3, however, in alternate embodiments κ could be any suitable integer or non-integer value. The total energy expended is thus proportional to the power consumption P times the time τ used to read the clip:

$$\Psi \propto \omega^\kappa \tau = \omega^3 \tau \qquad \text{(Eq2)}$$

The total energy consumption to read a given clip is given by $$\Psi_i = P_i * \tau_i \propto \omega_i^3 \tau_i = \left(\frac{s_i}{\sigma_i r_i}\right)^3 \tau_i \qquad \text{(Eq. 3)}$$

Thus, in accordance with the teachings of the invention, the total energy ψ for the entire read/write operation is minimized when the term on the right side of the proportionality shown in equation 3 is minimized.

CLV Embodiment

In view of Equations 1 and 3, and considering that s and σ are substantially constant, it can be seen that ψ is a function of $\tau/r^3$. Since s is a constant, the direct relation $\tau$=L/s gives that $\psi \propto L/r^3$. In this embodiment, the value of T is not relevant, as long as $\tau$<T.

The proportionality $\psi \propto L/r^3$ can be interpreted as follows: if the lengths of the clips were distributed randomly, the optimal placement of the clips would be to distribute them as $R(L) \propto L^{1/3}$ (since the derivative of $\psi$ is then near zero). In other words, this means that clips should be placed as far to the edge of the disk as possible; however, when the clips are of varying lengths, the order of placement becomes significant and should follow $R(L) \propto L^{1/3}$. For discrete values ($N_i$ clips of length $L_i$), that distribution is optimal which minimizes $$\Psi = \sum N_i L_i / R_i^3 \propto \frac{L}{R^3}. \quad \text{(Eq. 4)}$$

This calculation is, however, generally too theoretical for most practical work, in which several factors must be considered, such as: limited total disk space; long clips may wrap around several tracks (i.e. a large range or R); the clips compete with each other for space; and it is difficult to predict the values of N and L with precision.

Therefore, the following example illustrates less complex, but not limiting, features of the invention teaching the placement of clips in a CLV embodiment. In this example there are two clip lengths: 2 clips with length 6 and 3 clips with length 4. The units are arbitrary, but could represent MB or any suitable clip length units. In addition, the example assumes different values of T for the clips: T1=6, T2=2. This could correspond to long audio clips (with long read times acceptable) and short video clips (with high bandwidth demands).

Referring also to FIG. 12 there are shown 10 tracks with radii from 12 to 30 (again arbitrary units, but if these are in mm, the disk approximates, for example, a DataPlay disk) to which the clip lengths can be distributed or permuted. Each track, in this example, holds at most one clip.

In this example an optimal clip placement requiring the least power, places the 6-clips in the two outermost tracks and the 4-clips immediately before them (column TB in FIG. 12; the values for psi have been multiplied by 10000 for the sake of readability). The worst column, requiring the most power, is also shown (WORST column in FIG. 12). In the RANDOM columns, the clips are distributed randomly amongst the tracks. The columns have been placed in order of decreasing power $\psi$, showing that the most advantageous scenarios are those in which the large clips are distributed close to the outer edge. It will be readily appreciated from this example that finding a practical optimization distribution when there are thousands of clip lengths often requires empirical estimates and even speculation, and therefore the optimum distribution shown in column TB in FIG. 12 may not be readily determinable.

Referring still to FIG. 12, it will be appreciated that OPTIMIZED distribution columns represent many possible clip length distributions that may be readily determined according to the methods presented herein. In this example, one method divides the disk into two zones. Only 6-length clips are placed in the outer zone. Since the ratio of short to long clips is 3:2, the tracks are also divided 3:2 or 6:4; i.e. the 6-length clips are only located in the outer 4 tracks.

Still referring to FIG. 12, the OW column shows the least favorable configuration using this method. The OR columns show random permutations using this method. The OB column shows the lowest-energy consumption with this method.

Using the optimized distribution methods presented herein, the value of $\psi$ remains below a maximum that is much less than the worst-case scenario. It will also be appreciated by those skilled in the art that over large runs the optimized distribution strategy results in lower values of $\psi$ than random placement. Reference may also be had to Listing 1, contained herein, illustrating computer code for this example.

Another example, illustrates a more complex clip distribution. In this example, there are a total of 5000 possible tracks. The clips are 4 MB MP3 clips. The distribution strategy is places all the clips randomly in the outer half of the disk rather than in any position. In this example, overlapping of files is possible but does not result in large errors because the disk is well below the limit.

Figure 4:
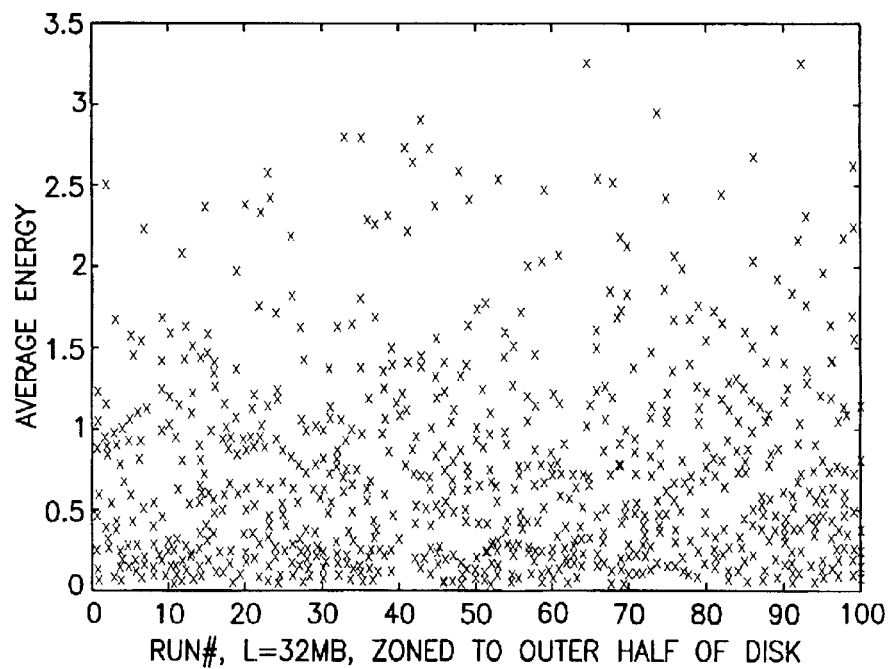
FIG. 4 shows the relative energies of optimized/non-optimized distribution strategies.
Figure 7:
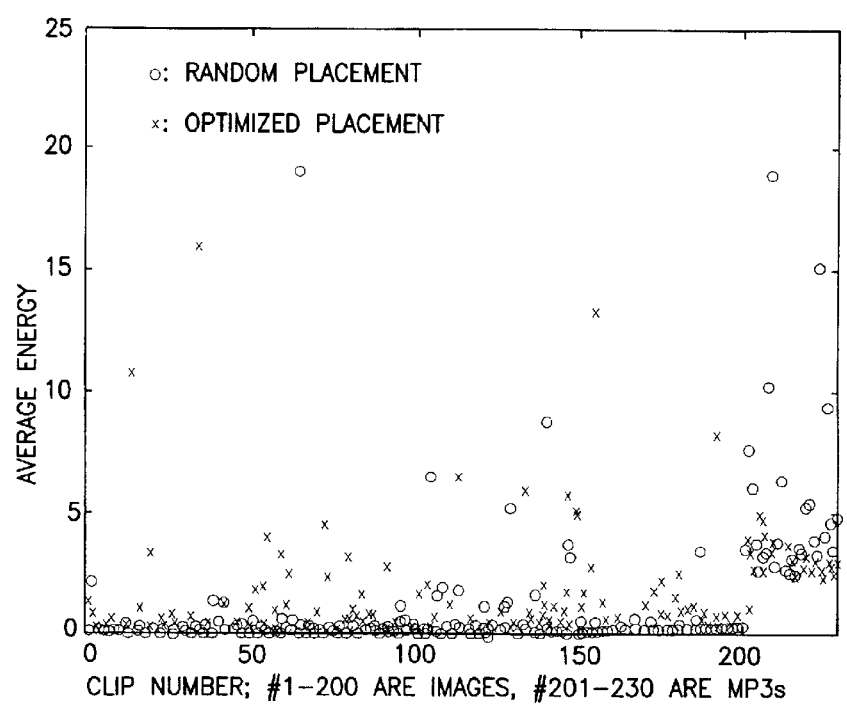
FIG. 7 shows the comparative average energy between the random and optimized distribution of data clips shown in FIG. 5 and FIG. 6, respectively.

A baseline comparison strategy was used in which the clip could be paced anywhere on the disk. Ten clips per run were placed; 100 runs were made. FIG. 4 shows the relative energies of the optimized/non-optimized distribution strategies; all values below 1 in FIG. 4 mean that the optimized distribution of the clips have a lower energy requirement (for write/read operations) than the non-optimized clips.

It will be readily appreciated from FIG. 4 that the mean value over all the runs is 0.70; or in other words, a 30% energy savings is obtained.

CAV Embodiments

In Equation 3, $\omega$ is a constant and $\psi$ is a function of $\tau$ only. In this embodiment, $\tau$=L/s=L/$\sigma\omega$r. Since $\sigma$ and $\omega$ are constant, $\psi \propto L/r$ and thus $R(L) \propto L$. The optimal clip distribution minimizes $$\Psi = \sum N_i L_i / R_i \propto \frac{L}{R}. \quad \text{Eq. 5}$$

Figure 3:
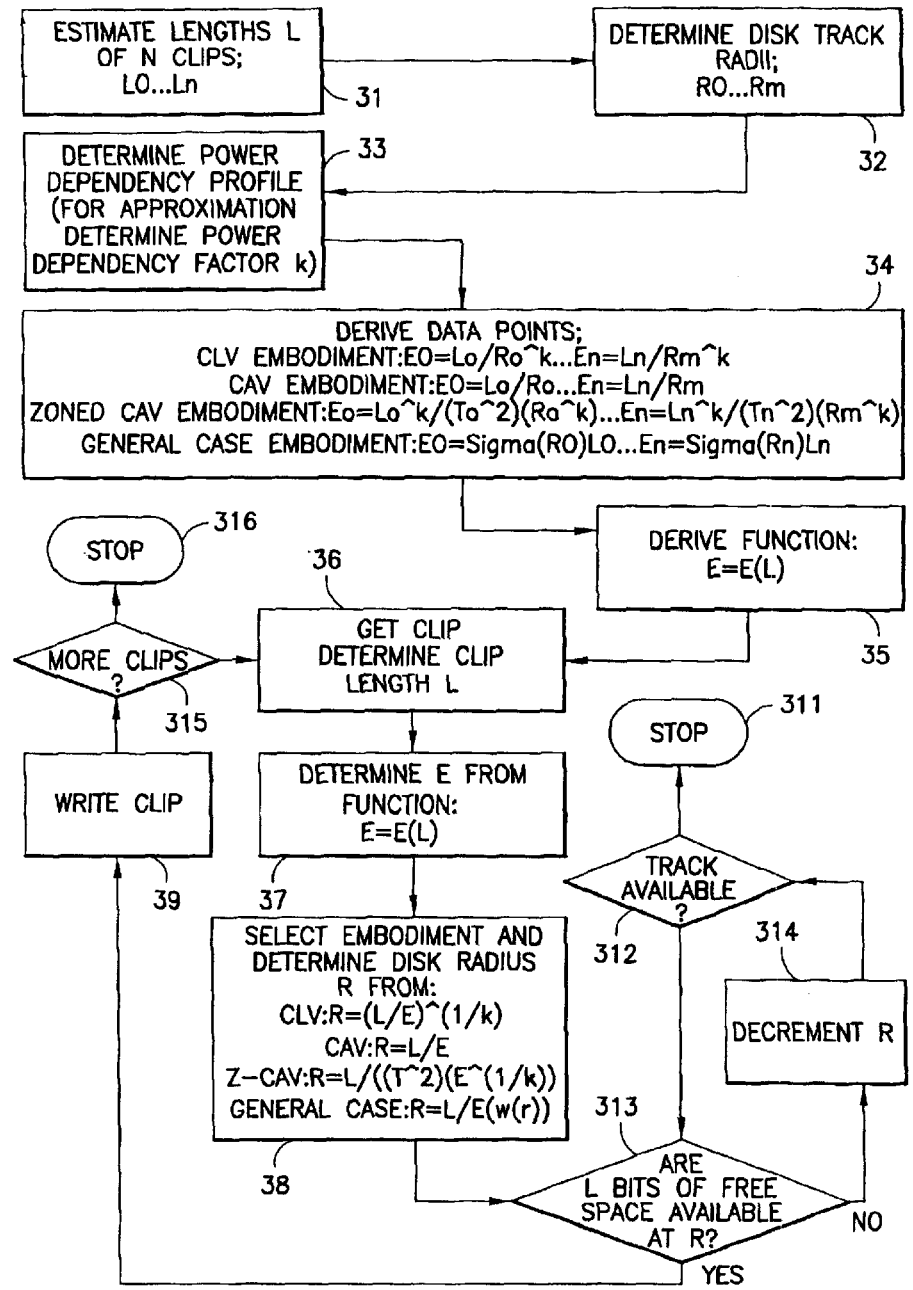
FIG. 3 is a flow chart illustrating method steps of an embodiment of the present invention shown in FIG. 2.

Referring to FIG. 13 there is shown a distribution table similar to the distribution table for the CLV embodiment. A scaling of 100 has been used for the $\psi$ values to enhance readability. It is appreciated that for the CAV embodiment of the present invention, a distribution strategy similar to the distribution method presented above can be used and is shown in FIG. 3.

In another example, where the files do not overlap (because the disk is filled more tightly), a total of 200 images (100 kB) and 30 MP3s (4 MB) are distributed in accordance with the teachings of the present invention. In this example, the more complex distribution strategy results in the MP3 clips filling the outer half and the image clips filling the inner half of the disk Advantageously, the read/write energy savings are considerable, especially for the larger clips. Reference may also be had to Listing 2, contained herein, illustrating computer code for this example In a zoned CAV embodiment, a disk is divided into several zones (rings) within which $\omega$ is a constant; $\omega$ may be different for different zones. This is the most complex case, because the placement strategy depends on both L and T. In this embodiment the bit rate s is allowed to vary, but the number of zones is kept to a minimum. Also, the rotation speeds for the zones can be exactly minimized so that $\tau$=T=L/s=L/$\sigma\omega$r (where r is the radius of the place where the clip starts), giving $$\Psi_i = P_i * \tau_i \propto \omega_i^3 \tau_i = \left(\frac{s_i}{\sigma_i r_i}\right)^3 T_i = \frac{1}{\sigma} \frac{L^3}{T^2 r^3} \propto \frac{L^3}{T^2 r^3}, \quad \text{(Eq. 6)}$$

which is a more complex dependency than before: $R(L,T) \propto L/T^{2/3}$. The optimal distribution minimizes $$\Psi = \Sigma N_i L_i^3 / (T_i^3 R_i^3).$$ Eq. 7

A distribution pattern representing this embodiment is shown in FIG. 14.

Also, again referring to FIG. 3 there is the flow chart illustrating method steps of one embodiment of the present invention. In this embodiment, steps 34 and 38 use the Zoned CAV embodiment dependencies in determining data points and radius R, respectively.

Figure 8:
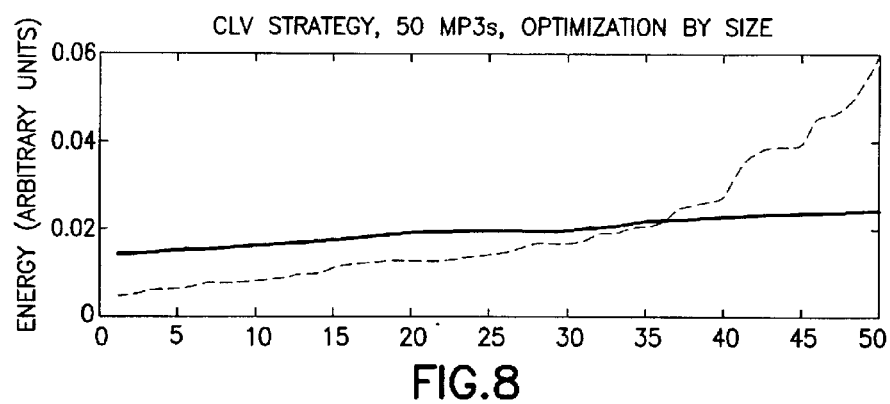
FIG. 8 is a graph illustrating features of the present invention in a CLV embodiment.
Figure 9:
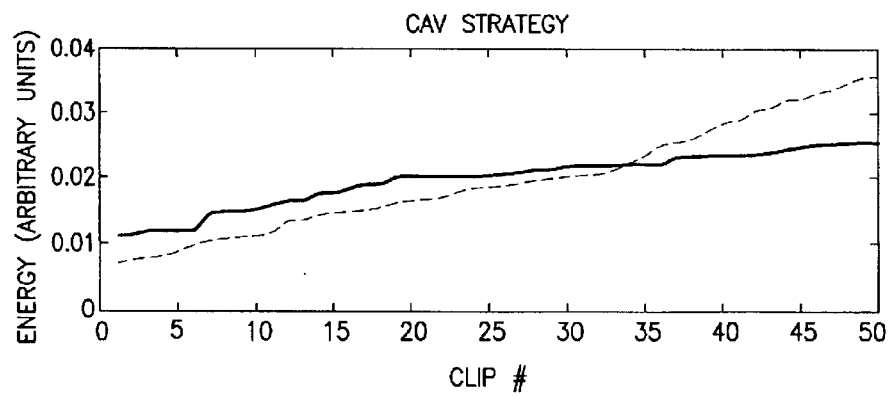
FIG. 9 is a graph illustrating features of the present invention in a CAV embodiment.

In another example, in which disk has 50 clips of only one type (MP3) with differing lengths (2–9 MB each). In the optimized strategy, the clips are simply sorted and the longest clips are filled from the outer edge. FIGS. 8 and 9 show cases for CLV and CAV distributions, respectively. It will be appreciated that the energies required to read the clips in the CLV embodiment are almost constant, regardless of the clip size. Reference may also be had to Listing 3, contained herein, illustrating computer code for this example.

It will be further appreciated that this constant energy feature is significant advantage for energy management, since a steady and predictable current is generally preferable to large peaks and is less damaging to the battery (no current surges).

Referring to FIG. 3 there is shown a flow chart illustrating method steps of alternate embodiments of the present invention. Step 31 estimates one or more clip lengths L of a predetermined number of clips, in addition to an estimated minimum clip length $L_0$ of $Clip_0$. Any suitable number of clip lengths may be estimated. In addition, any suitable method for estimating length of clips may be used, including deriving from specifications or air interface standards. In the alternate embodiments a suitable number of clip lengths may be buffered and suitably sampled to determine clip lengths.

The next step 32 determines disk track radii from $R_0$ to $R_m$; in a preferred embodiment $m \geq 2$. Step 33 determines a power dependency factor k. In the CLV embodiment the preferred power dependency factor is k=3. In alternate embodiments, such as the CAV embodiment, the preferred power dependency factor is k=1. In other alternate embodiments the power dependency factor k may be any suitable value.

Step 34 derives data points according to $E0=L0/R0^k$ ... $En=Ln/Rm^k$. Step 35 then derives a function E=E(L) from the data points derived in step 34. Any suitable method or technique may be used to derive a appropriate minimum energy function E=E(L), such as, but not limited to, linear regression techniques, curve fitting, weighted variables, or weighted or running averages.

Step 36 determines a clip length L. Clip length L may be determined by any suitable means such as buffer read or binary division. Step 37 determines from function E=E(L) the minimum energy. Step 38 then determines the corresponding disk radius from $R=(L/E)^{1/k}$. Decision step 313 determines if there are L bits of free space available at radius R and writes, step 39, if space is available. Step 315 passes control to step 36 if more clip lengths are to be read. Step 314 decrements the radius R by one-track radius or one-track segment radius to the next smaller radius if the space is not available. Step 312 determines if a track is available at this smaller radius and if affirmative, allows decision step 313 to determine if L bits of disk space is available at radius R; otherwise step 312 passes control to stop step 311. Stop step 311 may include any suitable processes for providing automatic warnings that track space is not available or passing control to error control sections.

Figure 3A:
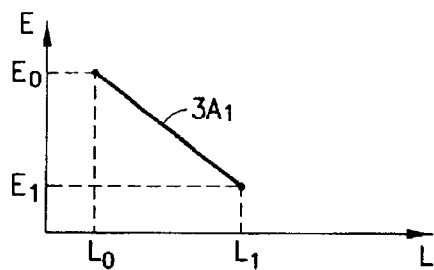
FIGS. 3A and 3B are graphical representations of one method for determining radius R in accordance with the method steps shown in FIG. 3.
Figure 3B:
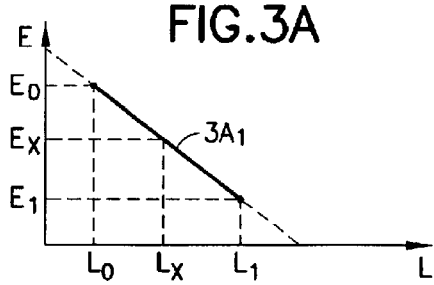

Referring also to FIGS. 3A and 3B, there are shown graphical representations of one embodiment of the method steps shown in FIG. 3. FIG. 3A shows two data points, represented by $E_0=L_0/R_0^k$ and $E_1=L_1/R_1^k$, for a given value of k. As shown in FIG. 3A, a function is derived using a straight-line equation derivation according to step 35; function is represented in FIG. 3A as line 3A1. Next, a clip length is determined, according to step 36, and shown in FIG. 3B as $L_x$. Then according to step 37, power E is determined. In the graphical, straight-line function shown in FIGS. 3A and 3B, $E_x$ may be read directly from the graph. It will be appreciated that in preferred embodiments the value $E_x$ will be calculated using the straight line equation $E_x = mL_x + b$; straight line equations are well known and will not be discussed here.

It has been shown that features of the present invention advantageously decreases the average power consumption of disk memories, in particular when the data is stored in clips of approximately known lengths and there are restrictions on the access times. Energy reduction is realized by optimizing data block distribution on disk surface so that access time will be minimized.

It should be understood that the foregoing description is only illustrative of the invention. Various alternatives and modifications can be devised by those skilled in the art without departing from the invention. For example, alternative embodiments may include any wireless or non-wireless multimedia products, in which data is disk stored in packets or clips of varying lengths. Accordingly, the present invention is intended to embrace all such alternatives, modifications and variances that fall within the scope of the appended claims.

---

Listing 1: Matlab routines for CLV simulation SIM_CLV_1

```
TestRuns=20;
energymat=zeros (TestRuns,10);
for i=1:100;
    clv_optimization;
    energymat (i, :) =psi./PsiRaw;
end;
%---------------------------------------------------
function y=omega_clv (thruput, sig, r);
y= thruput/ (sig*r);
%---------------------------------------------------
%function clv_optimization %JSM, 7.6.2001
DataTypes=2; %Option to use more than one data type
L=1:DataTypes; %Length of clip, kilobits
T=1:DataTypes; %Maximum time allowed for reading of clip.
seconds
```

-continued

Listing 1: Matlab routines for CLV simulation SIM_CLV_1

```
N=1:DataTypes; %Number of clips on disk
Kappa_omega=3; %Power consumption = omega^Kappa_omega,
default 3 ?????
L(1)=800; T(1)=60; N(1)=0; %No small files
L(2)=32000; T(2)=20; N(2)=10; %Large files on outer
edge
%---------------------- %Define tracks; example values
    TracksPerMillimeter=500; %Default 1351
    MinRad=5; %Inner radius of disk, mm
    MaxRad=15; %Outer radius, mm
    NumOfTracks = TracksPerMillimeter* (MaxRad-MinRad);
%Number of tracks
    rad=MinRad+ (MaxRad-MinRad) * (1:NumOfTracks) /NumOfTracks;
    Sigma=3.3; %Kilobits/mm
    Thruput=8000; %Kbits/s
%----------------- %Calculate omega-profile
om_min=omega_clv (Thruput,Sigma,rad(1));
om_max=omega_clv (Thruput,Sigma,rad(NumOfTracks));
%------------------------ %Non-optimized
    %Randomize positions of clips
    PsiRaw=zeros(1,sum(N));
%Permute locations
    randind=randperm (NumOfTracks);
randind=randind (1:sum (N));
    for k=1:sum(N);
        if (k<=N(1));
            PsiRaw(k) =
        omega_clv(Thruput,Sigma,rad(randind(k))).
        ^Kappa_omega* (L(1) /Thruput);
        else;
            PsiRaw (k) =
        omega_clv (Thruput,Sigma,rad(randind(k)))
        ^Kappa_omega* (L(2) /Thruput);
        end;
    end;
    RandomizedEnergy=sum (PsiRaw);
%------------------------ %Optimized performance
    %Place clips
    BreakTrack=NumOfTracks/2; %Breakpoint
    psi=zeros (1,sum(N))
    op1=randperm (BreakTrack);
    op2=randperm (NumOfTracks-BreakTrack+1) +BreakTrack-1;
    optind(1:N(1)) =op1(1:N(1));
    optind((N (1)+1) :sum(N)) =op2(1:N(2));
    for k=1:sum(N);
        if (k<=N (1));
            ^psi (k)=omega_clv(Thruput,Sigma,rad(Optind(k))).
        ^Kappa_omega* (L(1) /Thruput);
        else;
            psi (k)=omega_clv (Thruput,Sigma,rad (optind (k))).
        ^Kappa_omeqa* (L(2) /Thruput);
        end;
end;
    OptimizedEnergy=sum(psi);
```

Listing 2: Matlab routines for CAV simulation SIM_CAV_0

```
Kappa_omega=3; %Power consumption = omega^Kappa_omega,
default
%Placeholders left for other types of data, only image
and MP3
used in this case
N(1)=200; N(2)=0; N(3)=30; N(4)=0; %Pics, MMS, MP3,
Games
Clips=sum(N)
a1=1; b1=N(1); a2=b1+1; b2=a2+N(2)-1; a3=b2+1;
b3=a3+N(3)-1;
    a4=b3+1; b4=a4+N(4)-1;
L(a1:b1)=800; T(1:b1)=40; Type(a1:b1)=1; %Images
L(a2:b2)=4000; T(a2:b2)=5; Type(a2:b2)=2; %MMS, not used
L(a3:b3)=32000; T(a3:b3)=5; Type(a3:b3)=3; %MP3
```

-continued

Listing 2: Matlab routines for CAV simulation SIM_CAV_0

```
L(a4:b4)=128000; T(a4:b4)=1; Type(a4:b4)=4; %Games, not
used
    R_r=0; %Random organization
    R_o=0; %Optimized org
        %---------------------- %Define tracks; Example spec
values
        TracksPerMillimeter=1351; %Default 1351
        MinRad=5; %Inner radius of disk, mm
        MaxRad=15; %Outer radius, mm
        NumOfTracks = TracksperMillimeter* (MaxRad-MinRad);
%Number of tracks
        rad=MinRad+ (MaxRad-MinRad) * (1:NumOf Tracks) /NumOfTracks;
        Sigma=3.3; %Kilobits/mm
        %Value of omega does not matter as it is scaled out
        if (sum(L) > 2000000);
        warning('Your capacity is probably being
overfulfilled');
    else;
        %Constants for linear approximation
        RadiusEpsilon=1; %Max error from optimal,
millimeters
        a=(MaxRad-MinRad-2*RadiusEpsilon) / (max(L) -min(L));
        b=MaxRad-RadiusEpsilon-a*max(L);
        %--------------------------- %Random
        taken_r=zeros(1,NumOfTracks);
        randind=randperm (NumOfTracks);
        j=0;
        for i=Clips:-1:1;
            foundflag=0;
            while ((foundflag==0))
                j=j+1; if (j>length(randind)); j=1; end;
%Prevent overrun
                z=randind(j); %This is the random placement
                thickness= ceil (L(i) / (2*pi*rad(z)*Sigma));
                if (z < (NumOfTracks-thickness))
                    zsum=sum(taken_r(z: (z+thickness)));
                    if (zsum==0); foundflag=1; R_r(i)=z;
taken_r(z: (z+thickness))=1; end;
            end; end; end;
        %---------------------------
        %Optimized
        taken_o=zeros (1,NumOfTracks)
        for i=Clips:-1:1;
            foundflag=0;
            zz=0; %zz increases the search range over time
            while (foundflag==0);
                zz=zz+1;
                r_optimal=a*L(i)+b+RadiusEpsilon*2* (rand(1)-
0.5) * (sqrt(zz));
                z=min(find(rad>r_optimal));
                thickness= ceil(L(i) ./ (2*pi*rad(z)*Sigma));
                if (z < (NumOfTracks-thickness))
                    zsum=sum(taken_o(z: (z+thickness)));
                    if (zsum==0); foundflag=1; R_o(i)=z;
taken_o(z: (z+thickness))=1; end;
            end; end; end;
        %-----------------------------------
        %Energy function
        psi_r=L./R_r;
        psi_o=L./R_o;
        psisum_r=sum(psi_r);
        psisum_o=sum(psi_o);
    end;
```

Listing 3: SIM_ENERGY

```
%Only one type of data, but lengths vary
Clips=50;
L=16000+ 56000*rand(1,Clips); %(2MB plus 0-7MB);
L_r=L; %Random order
L_o=fliplr(sort(L)); %Optimize order
```

-continued

Listing 3: SIM_ENERGY

```
R_r=0; %Random organization
R_o=0; %Optimized org
%----------------------
Kappa_omega=3; %Power consumption = omega^Kappa_omega,
default 3 ?????
```

-continued

Listing 3: SIM_ENERGY

```
%Define tracks; Example specs
TracksPerMillimeter=1351; %Default 1351
MinRad=5; %Inner radius of disk, mm
MaxRad=15; %Outer radius, mm
NumOfTracks = TracksPerMillimeter* (MaxRad−MinRad);
%Number of tracks
rad=MinRad+ (MaxRad−MinRad) * (1:NumOfTracks) /NumOfTracks;
Sigma=3.3; %Kilobits/mm
Thruput=8000; %Kbits/s, assumption!
if (sum(L) > 2500000); %Take care that disk doesn't get
filled
    warning('Your capacity is probably being
overfulfilled');
else;
    %---------------------------
    %Place clips in order from outer edge
    taken_r=zeros(1,NumOfTracks); %Tracks that have been
written on
    taken_o=zeros(1,NumOfTracks);
    j_r=NumOfTracks; %j tracks beginning track # of clip
    j_o=NumOfTracks;
    for i=1:Clips;
        %Random organization
            rad_r=rad(j_r);
        %Number of tracks taken by clip
            thickness_r= ceil(L_r(i) / (2*pi*rad_r*Sigma));
            j_r=j_r−thickness_r; %Start point
            taken_r(j_r:(j_r+thickness_r))=1; %Reserve tracks
        %Inner edge; this could also be the average of the
outer & inner edge
            R_r(i)=rad(j_r);
        %Ordered organization
            rad_o=rad(j_o);
            thickness_o= ceil(L_o(i) / (2*pi*rad_o*Sigma));
            j_o=j_o−thickness_o;
            taken_o(j_o:(j_o+thickness_o))=1;
            R_o(i)=rad(j_o);
    end;
    %----------------------------------
    %Energy function
    %Constant linear velocity
psi_r_clv=(omega_clv(Thruput,Sigma,R_r).^Kappa_omega).*(L
_r/Thruput);
psi_o_clv=(omega_clv(Thruput,Sigma,R_o).^Kappa_omega).*(L
_o/Thruput);
    %Constant angular velocity, rough approximation only
        psi_r_cav=(L_r./R_r); psi_o_cav= (L_o./R_o);
        psisum_r_clv=sum(psi_r_clv);
psisum_o_clv=sum(psi_o_clv);
        psisum_r_cav=sum(psi_r_cav);
psisum_o_cav=sum(psi_o_cav);
end;
```

What is claimed is:

1. A method for optimizing energy consumption during data read/write operations in a disk-based memory, the method comprising the steps of:

providing a disk-based memory, the disk-based memory having at least one recordable track, the at least one recordable track having at least one recordable track segment and associated track segment radii $R_0 \ldots R_m$;

reading a data clip, wherein the data clip comprises a data clip length, $L_s$;

determining a track segment radius from the associated track segment radii $R_0 \ldots R_m$, wherein the track segment radius corresponds to an available energy-optimum recordable track segment from the at least one recordable track, wherein determining the track segment radius further comprises making the determination based at least partially on the data clip length $L_s$; and writing the data clip, on the available energy-optimum recordable track segment.

2. A method as in claim 1 wherein determining the track segment radius further comprises:

estimating a unique clip length range $L_0 \ldots L_N$, and $N \geq 1$;

associating the unique clip length range $L_0 \ldots L_N$ with the disk track segment radii range $R_0 \ldots R_m$; and deriving an optimum energy function from the associated unique clip length range $L_0 \ldots L_N$ with the disk track segment radii range $R_0 \ldots R_m$.

3. A method as in claim 2 wherein associating the unique clip length range $L_0 \ldots L_N$ with the disk track segment radii range $R_0 \ldots R_m$ further comprises:

corresponding each unique clip length LR from the range of unique clip lengths $L_0 \ldots L_N$ with the disk track segment radii range $R_R = R_0 \ldots R_m$ according to:

$$R_R = (((L_R - L_{min})/(L_{max} - L_{min})) (R_{max} - R_{min})) + R_{min}; \text{ and}$$

adjusting $R_R$ to the closest track segment radius from the associated track segment radii.

4. A method as in claim 3 wherein deriving the optimum energy function further comprises deriving a first optimum energy function $E_s = E_s(L_s)$ from data points given by:

$$(E_0 = L_0/R_0\hat{}k), L_0 \ldots (E_n = L_n/R_m\hat{}k), L_n, \text{ where k is predetermined.}$$

5. A method as in claim 3 wherein deriving the optimum energy function further comprises deriving a second optimum energy function from data points given by:

$$(E_0 = L_0\hat{}k/(T_0\hat{}(k-1))(R_0\hat{}k)), L_0 \ldots (E_n = L_n\hat{}k/(T_m\hat{}(k-1)) (R_m\hat{}k)), L_n.$$

6. A method as in claim 3 wherein deriving the optimum energy function further comprises deriving a second optimum energy function from data points given by:

$$(E_0 = \xi(Ro)Lo), L_0 \ldots (E_n = \xi(Rm)Ln), L_n.$$

7. A method as in claim 3 wherein determining the track segment radius further comprises:

determining energy $E_s$ associated with $L_s$ according to the optimum energy function $E_{s=Es}(L_s)$;

calculating radius R associated with energy $E_s$ and clip length $L_s$;

determining number of free bits at calculated radius R;

comparing clip length $L_s$ with the number of free bits at the calculated radius R; and decreasing the radius R if the number of free bits is less than clip length $L_s$.

8. A method as in claim 7 wherein decreasing the radius R if the number of free bits is less than clip length $L_s$ further comprises decreasing the radius R by one track radius if the number of free bits is less than clip length $L_s$.

9. A method as in claim 7 wherein decreasing the radius R if the number of free bits is less than clip length $L_s$ further comprises decreasing the radius R by one track segment radius if the number of free bits is less than clip length $L_s$.

10. A method as in claim 1 wherein reading the data clip further comprises reading an image data clip.

11. A method as in claim 1 wherein reading the data clip further comprises reading an MP3 data clip.

12. A method as in claim 1 wherein reading the data clip further comprises reading a game data clip.

13. A method as in claim 1 wherein the at least one recordable track comprises a plurality of recordable tracks, each of the plurality of recordable tracks having at least one recordable track segment and one of the associated track segment radii $R_0 \ldots R_m$.

14. A method as in claim 1 wherein the at least one recordable track comprises a single recordable track.

15. A system, the system comprising:
   a controller;
   a wireless transceiver; and
   a memory, the memory comprising a disk-based memory system adapted to reduce power consumption E during data clip write/read operations based in part on a length of the data clip, wherein the disk-based memory comprises at least one recordable track having radii $R_0 \ldots R_m$.

16. A system as in claim 15 wherein the disk-based memory system further comprises a function generator, the function generator adapted to derive a function E=E(L), where E=power consumption, L=data clip length.

17. A system as in claim 16 wherein the function generator is adapted to derive the function E=E(L) from data points given by:

$$(E_0 = L_0/R_0^{\hat{}}k), L_0 \ldots (E_n = L_n/R_m^{\hat{}}k), L_n,$$

where:
   k is predetermined; and
   $L_0 \ldots L_n$=data clip length for n≧1.

18. A system as in claim 16 wherein the function generator is adapted to derive the function E=E(L) from data points given by:

$$(E_0 = L_0^{\hat{}}k/((T_0^{k-1})(R_0^k)), L_0 \ldots (E_n = L_n^{\hat{}}k/((T_n^{k-1})(R_n^k)), L_n,$$

where:
   k is predetermined; and
   $L_0 \ldots L_n$ =data clip length for n≧1.

19. A system as in claim 16 wherein the function generator is further adapted to derive a second optimum energy function from data points given by:

$$(E_0 = \xi(Ro)Lo), L_0 \ldots (E_n = \xi(Rm)Ln), L_n;$$

where $L_0 \ldots L_n$ =data clip length for n≧1.

20. A system as in claim 15 wherein the disk-based memory system further comprises a data-energy optimizer, the data-energy optimizer adapted to determining the optimum radius R to read/write a data clip of length $L_s$.

21. A system as in claim 20 wherein the data-energy optimizer is adapted to determine the optimum radius R to read/write a data clip of length $L_s$ according to:

$$R=(L_s/E)^{1/k}, \text{ where k is predetermined.}$$

22. A system as in claim 20 wherein the data-energy optimizer is adapted to determine the optimum radius R to read/write a data clip comprising length $L_s$ and time T according to:

$$R=L_s/((T^{(k-1)/k})(E^{1/k})), \text{ where k is predetermined.}$$

23. A system as in claim 20 wherein the data-energy optimizer is adapted to determine the optimum radius R to read/write a data clip comprising length $L_s$ according to: $R=L_s/E(w(r))$.

24. A system as in claim 15 wherein the system comprises a mobile communications system.

25. A system as in claim 15 wherein the disk-based memory system is further adapted to minimize power consumption E during data clip write/read operations based in part on the length of the data clip and the radii $R_0 \ldots R_m$.

26. A method for optimizing energy consumption during data read/write operations in a mobile device, the method comprising the steps of:
   providing a disk-based memory, the disk-based memory having at least one recordable track and associated track radii $R_0 \ldots R_m$;
   reading a data clip length, $L_s$, for a data clip;
   determining, based at least partially on the data clip length $L_s$, an available energy-optimum recordable track from the at least one recordable track; and
   writing the data clip on the available energy-optimum recordable track.

27. A method as in claim 26 wherein providing the disk-based memory having at least one recordable track further comprises providing the disk-based memory having at least one recordable spiral track.

28. A method as in claim 26 wherein the disk-based memory system comprises a constant linear velocity (CLV) disk-based memory system.

29. A method as in claim 26 wherein the disk-based memory system comprises an angular velocity disk-based memory system.

30. A method as in claim 29 wherein the angular velocity disk-based memory system comprises a constant angular velocity (CAV) disk-based memory system.

31. A method as in claim 30 wherein the CAV disk-based memory system comprises a zoned CAV.

32. A method comprising:
   providing a disk-based memory, the disk-based memory having at least one recordable track comprising at least one recordable track segment, each of the recordable track segments occurring at a radius;
   determining a data clip length, $L_s$, of a data clip;
   determining an energy based at least partially on the data clip length, $L_s$;
   determining a given radius based at least partially on the data clip length, $L_s$, and the energy;
   determining an available recordable track segment corresponding to the given radius; and
   writing at least a portion of the data clip on the available recordable track segment.

33. A method as in claim 32 wherein determining an available recordable track segment corresponding to the radius further comprises selecting a recordable track segment that can hold the at least a portion of the data clip and that is closest to the given radius.

34. A method as in claim 32 wherein the at least one recordable track comprises a single spiral track comprising a plurality of recordable track segments.

35. A method as in claim 32 wherein the at least one recordable track comprises a plurality of recordable tracks, each of the plurality of recordable tracks comprising one or more recordable track segments.

36. An apparatus comprising:
   means for determining a data clip length, $L_s$, of a data clip stored on a disk-based memory, the disk-based memory having at least one recordable track comprising at least one recordable track segment, each of the recordable track segments occurring at a radius;
   means for determining an energy based at least partially on the data clip length, $L_s$;
   means for determining a given radius based at least partially on the data clip length, $L_s$, and the energy;
   means for determining an available recordable track segment corresponding to the given radius; and
   means for writing at least a portion of the data clip on the available recordable track segment.

37. An apparatus as in claim 36 wherein the means for determining an available recordable track segment corresponding to the radius further comprises a means for selecting a recordable track segment that can hold the at least a portion of the data clip and that is closest to the given radius.

* * * * *

UNITED STATES PATENT AND TRADEMARK OFFICE
CERTIFICATE OF CORRECTION

PATENT NO. : 6,961,860 B2
DATED : November 1, 2005
INVENTOR(S) : Makela et al.

It is certified that error appears in the above-identified patent and that said Letters Patent is hereby corrected as shown below:

Column 14,
Line 22, delete "$(L_5)$" and insert -- $(L_s)$ --.

Signed and Sealed this

Twenty-seventh Day of December, 2005

JON W. DUDAS
*Director of the United States Patent and Trademark Office*